(12) United States Patent
Glenn et al.

(10) Patent No.: US 6,672,773 B1
(45) Date of Patent: Jan. 6, 2004

(54) OPTICAL FIBER HAVING TAPERED END AND OPTICAL CONNECTOR WITH RECIPROCAL OPENING

(75) Inventors: Thomas P. Glenn, Gilbert, AZ (US); Steven Webster, Metro Manila (PH)

(73) Assignee: Amkor Technology, Inc., Chandler, AZ (US)

(*) Notice: Subject to any disclaimer, the term of this patent is extended or adjusted under 35 U.S.C. 154(b) by 0 days.

(21) Appl. No.: 09/751,536

(22) Filed: Dec. 29, 2000

(51) Int. Cl.[7] ................................................. G02B 6/38
(52) U.S. Cl. ......................................................... 385/70
(58) Field of Search .............................. 385/48, 70, 43, 385/31, 39, 49, 88, 121, 122, 123, 124, 125, 126, 127, 128, 129, 130, 131, 132, 146, 97, 98

(56) References Cited

U.S. PATENT DOCUMENTS

| | | | |
|---|---|---|---|
| 3,864,019 A | 2/1975 | Smolinsky et al. | 350/96 |
| 4,087,158 A | 5/1978 | Lewis et al. | 350/96.21 |
| 4,262,995 A | 4/1981 | Tangonan | 350/96.16 |
| 4,466,696 A | 8/1984 | Carney | 350/96.2 |
| 4,695,124 A | 9/1987 | Himono et al. | 350/96.2 |
| 4,735,482 A | 4/1988 | Yoshida et al. | 350/96.2 |
| 4,750,799 A | 6/1988 | Kawachi et al. | 350/96.11 |
| 5,011,254 A | 4/1991 | Edwards et al. | 350/96.18 |
| 5,078,516 A | 1/1992 | Kapon et al. | 385/129 |
| 5,309,537 A | 5/1994 | Chun et al. | 385/59 |
| 5,351,331 A | 9/1994 | Chun et al. | 385/97 |
| 5,390,266 A * | 2/1995 | Heitmann et al. | 385/44 |
| 5,404,417 A | 4/1995 | Johnson et al. | 385/137 |
| 5,475,775 A | 12/1995 | Kragl et al. | 385/14 |
| 5,526,454 A | 6/1996 | Mayer | 385/49 |
| 5,586,207 A | 12/1996 | Goodwin | 385/92 |
| 5,600,745 A | 2/1997 | Wuu et al. | 385/49 |
| 5,708,741 A | 1/1998 | DeVeau | 385/49 |
| 5,815,623 A | 9/1998 | Gilliland et al. | 385/93 |
| 5,818,994 A | 10/1998 | Hehmann | 385/89 |
| 5,845,024 A * | 12/1998 | Tsushima et al. | 385/43 |
| 6,058,125 A | 5/2000 | Thompson | 372/50 |
| 6,396,984 B1 * | 5/2002 | Cho et al. | 385/43 |
| 6,496,644 B1 * | 12/2002 | Sugawara | 386/146 |

OTHER PUBLICATIONS

Shiraishi, K.; Yanagi, T.; Kawakami, S., "Light–Propagation Characteristics in Thermally Diffused Expanded Core Fibers," Journal of Lightwave Technology, vol. 11, No. 10, Oct., 1993.

* cited by examiner

Primary Examiner—Javaid H. Nasri
(74) Attorney, Agent, or Firm—Bever, Hoffman & Harms, LLP; James E. Parsons

(57) ABSTRACT

A method and apparatus for connecting optical fibers to waveguides and other optical elements are disclosed. In one embodiment, an optical fiber is modified so as to have opposing orthogonal tapered sidewalls that taper toward a tip of the fiber. An optical connector for the fiber includes a base having a receiving section and a waveguide formed therein. The receiving section is a flared channel having opposing orthogonal tapered sidewalls and a horizontal bottom surface perpendicular to the sidewalls. The waveguide is optically accessible at a narrow inner end of the channel. The angle of taper of the sidewalls of the channel matches the angle of taper of the sidewalls of the optical fiber. When the optical fiber is inserted into the open end of the channel and is moved toward the narrow inner end of the channel, the sidewalls of the fiber and channel come into contact with each other. In addition, a bottom surface of the fiber rests on the horizontal bottom surface of the channel. The tip of the fiber is positioned adjacent to the waveguide in precise alignment along the x, y, and z axes. The optical fiber is thereby positioned for optical communication through the waveguide with another optical fiber, a light source, or a light receiving element positioned at an opposite end of the waveguide.

22 Claims, 4 Drawing Sheets

OPTICAL FIBER HAVING TAPERED END AND OPTICAL CONNECTOR WITH RECIPROCAL OPENING

BACKGROUND OF THE INVENTION

Optical fibers transmit signals in the form of light. A typical optical fiber is formed of glass, and includes a central core surrounded by cladding. The core is doped so as to have a different index of refraction than the cladding. Accordingly, light travels within the core.

A waveguide may be used to transmit light from one optical fiber to another optical fiber; from a light source, such as a laser diode on a semiconductor chip, to an optical fiber; or from an optical fiber to a light sensitive circuit on a semiconductor chip. The core of the optical fiber must be precisely aligned with the waveguide in order to prevent transmission loss. A typical alignment specification is within one micron.

Practitioners have attempted to develop devices and methods that facilitate the alignment of optical fibers and waveguides. In this regard, the reader is referred to U.S. Pat. Nos. 5,526,454; 4,262,995; 4,466,696; 3,864,019; and 5,600,745. Notwithstanding these efforts, a better solution is needed.

SUMMARY OF THE INVENTION

The present invention provides a reliable, simple, and inexpensive method and apparatus for precise optical connection of an optical fiber and a waveguide. For example, in one embodiment of the present invention, an optical connector is provided. The optical connector includes a base with an optical fiber receiving section and a waveguide therein. The receiving section includes a flared channel having an opening at a peripheral side of the base. The channel has opposing orthogonal tapered sidewalls and a horizontal bottom perpendicular to the sidewalls. Inward from the opening, the channel narrows in a lateral direction, because the opposing sidewalls extend diagonally towards each other. The waveguide is optically accessible at a narrow inner end of the receiving section opposite the opening. The connector may also include a cover that attaches to the base.

The present invention also includes an optical fiber that can be used in a self-aligning manner with the optical connector described above. The optical fiber has a first end section that includes a tip of the fiber. Part of the cladding of the first end section is removed so as to form opposing orthogonal tapered sidewalls. The sidewalls extend diagonally towards each other in a direction towards the tip of the fiber. The angle of taper of the opposing orthogonal sidewalls of the optical fiber matches the angle of taper of the opposing orthogonal sidewalls of the receiving section of the connector. The first end section of the optical fiber also may have a horizontal bottom surface and an opposing horizontal top surface that are perpendicular to the orthogonal sidewalls.

An exemplary method of optically connecting the optical fiber and connector described above includes inserting the first end section of the optical fiber into the opening of the receiving section of the connector, and sliding the bottom surface of the first end section of the fiber laterally along the bottom surface of the receiving section of the base toward the waveguide at the inner end of the receiving section. The optical fiber is inserted until the orthogonal sidewalls of the first end section contact the correspondingly-angled orthogonal sidewalls of the receiving section. Meanwhile, the bottom surface of the first end section of the optical fiber rests on the bottom surface of the receiving section of the connector. By virtue of the reciprocal tapering of the abutting sidewalls of the first end section of the fiber and the receiving section, and the abutting bottom surfaces of the first end section of the fiber and the receiving section, the core at the tip of the first end section of the optical fiber is positioned immediately adjacent to the waveguide of the connector with precise three dimensional alignment. Optionally, an adhesive may be used to affix the abutting surfaces of the first end section and the receiving section. An optically clear adhesive may be between the tip and the waveguide, providing an optical path therebetween. Where the connector is provided with a cover, the cover can be closed over the fiber and the waveguide.

These and other aspects of the present invention may be further understood by consideration of the attached drawings and the detailed description provided below.

DETAILED DESCRIPTION

Figure 1:
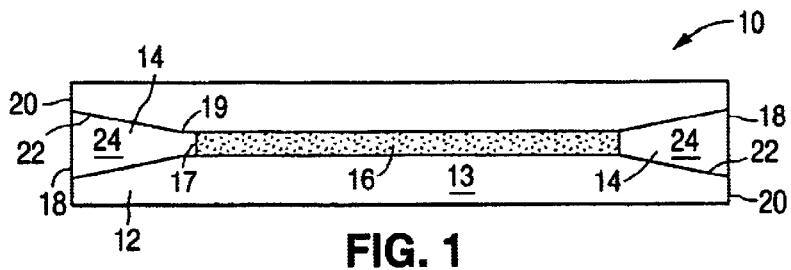
FIG. 1 is a top plan view of an optical connector.
Figure 2:
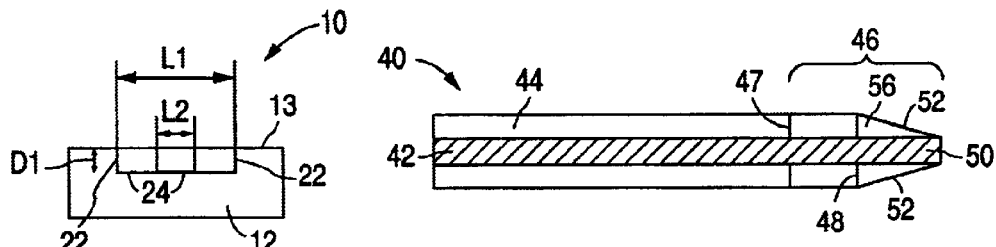
FIG. 2 is a side view of a peripheral side of the optical connector of FIG. 1.

FIGS. 1 and 2 show an optical connector 10 for optically connecting a pair of optical fibers. Optical connector 10 includes a base 12. A pair of opposing flared channels, denoted as receiving sections 14, are formed in base 12. Receiving sections 14 each terminate at an opposite side of a waveguide 16 that extends between and optically connects the receiving sections 14. Waveguide 16 is optically accessible through each receiving section 14.

Each receiving section 14 has an opening 18 at a peripheral side 20 of base 12. Waveguide 16 is at an inner end 19 of receiving section 14 distal from side 20 and opposite opening 18. Moving inward from side 20 of base 12, each receiving section 14 includes opposing, orthogonal, tapered sidewalls 22, and a horizontal bottom surface 24 (see FIG. 2) that is perpendicular to opposing sidewalls 22. The opposing sidewalls 22 extend diagonally toward each other in the direction of inner end 19 and waveguide 16, such that receiving section 14 decreases in width from opening 18 to inner end 19. Receiving section 14 has a width L1 between opposing sidewalls 22 at opening 18, and a smaller width L2 between opposing sidewalls 22 at inner end 19. Receiving section 14 has a vertical depth D1 between top surface 13 of base 12 and bottom surface 24 of receiving section 14.

Waveguide 16 transmits light from an optical fiber inserted into one of the receiving sections 14 to an optical fiber inserted into the opposing receiving section 14 of connector 10. Waveguide 16 has a width L2 in this embodiment.

Figure 3:
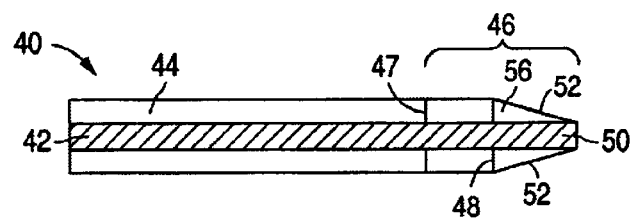
FIG. 3 is a top plan view of an optical fiber having a tapered end.
Figure 4:
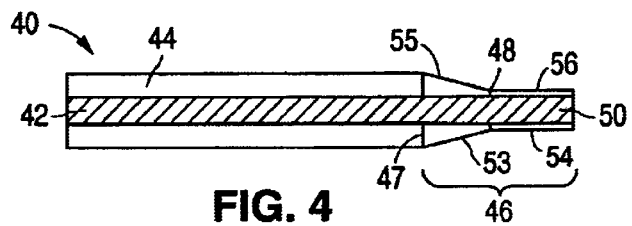
FIG. 4 is a cross-sectional side view of the optical fiber of FIG. 3 taken through the core of the fiber.
Figure 3A:
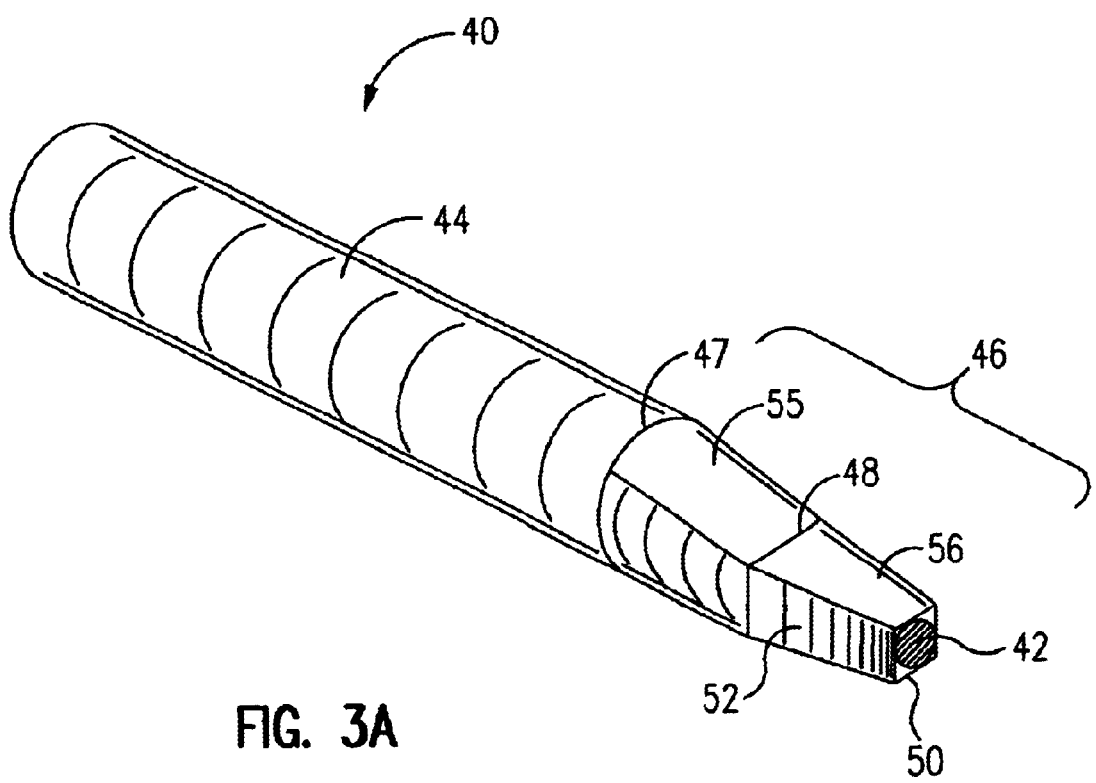
FIG. 3A is a perspective view of the optical fiber of FIGS. 3 and 4.

The present invention also includes an optical fiber that can be used with optical connector 10 to form a self-aligning optical assembly. Referring to FIGS. 3, 3A, and 4, an exemplary glass optical fiber 40 includes a cylindrical central core 42 surrounded by a cylindrical cladding 44. Light travels in core 42.

Optical fiber 40 has a first end section 46 that begins near and includes tip 50. The cladding of first end section 46 is partially removed, for example, by grinding, etching, or laser ablation. The removal of the cladding creates two opposing orthogonal tapered sidewalls 52 that extend diagonally towards each other in moving from taper boundary 48 toward tip 50. The width of first end section 46 between opposing sidewalls 52 decreases from a width equal to the outer diameter of cladding 44 at taper boundary 48 to a width between opposing sidewalls 52 that is slightly larger than the diameter of core 42 at tip 50. In addition, since first end section 46 of fiber 40 is intended to be inserted into receiving section 14 of connector 10, the width of first end section 46 of fiber 40 between orthogonal sidewalls 52 at taper boundary 48 is slightly less than the width L1 of opening 18 of connector 10, and the width of first end section 46 between sidewalls 52 at tip 50 is slightly less than the width L2 of inner end 19 of receiving section 14. The length of first end section 46 between taper boundary 48 and tip 50 is approximately equal to the length of receiving section 14 between opening 18 and inner end 19. The angle of taper of orthogonal sidewalls 52 of optical fiber 40 matches the angle of taper of the orthogonal sidewalls 22 of receiving section 14 of connector 10.

In addition, in this example embodiment, cladding 44 of first end section 46 is partially removed so as to form means for vertically aligning optical fiber 40 in connector 10. Beginning at inner boundary 47 of first end section 46 and extending toward taper boundary 48, cladding 44 is removed so as to form opposing tapered bottom and top surfaces 53 and 55, respectively. Beginning at taper boundary 48 and extending to tip 50, cladding 44 is removed so that tapered bottom and top surfaces 53 and 55 transition into opposing, horizontal bottom and top surfaces 54 and 56, respectively. The height of first end section 46 between bottom and top horizontal surfaces 54, 56 is slightly greater than the diameter of core 42 of optical fiber 40, and is equal to or slightly less than the depth D1 of receiving section 14 of connector 10.

Tip 50 of optical fiber 40 may be flat, or may be ground into a convex or other shape, depending on the application.

Figure 5:
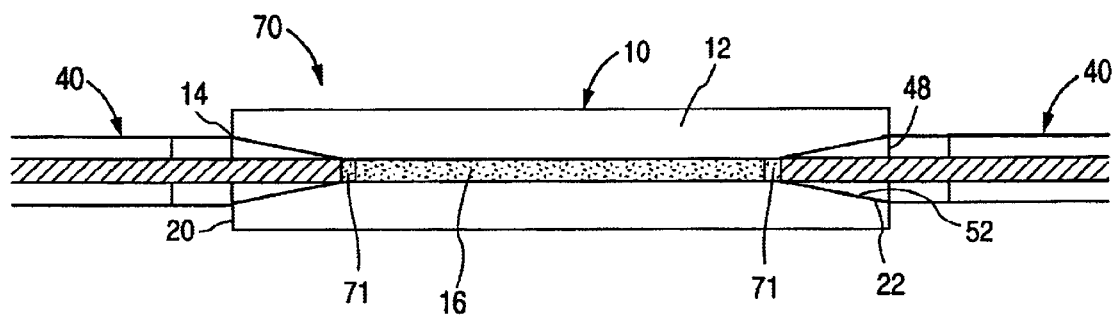
FIG. 5 is a top plan view of an optical assembly wherein the optical fiber of FIG. 3 is inserted into the optical connector of FIG. 1.
Figure 6:
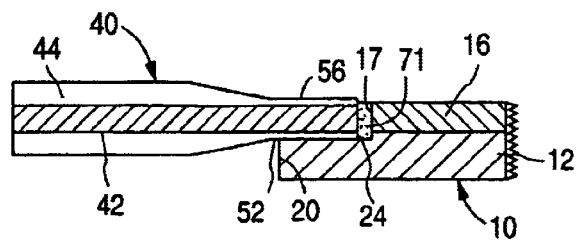
FIG. 6 is a cross-sectional side view of the left half of the optical assembly of FIG. 5 taken through the core of the fiber and the waveguide of the optical connector.

FIG. 5 illustrates a self-aligning optical assembly 70 wherein two optical fibers 18 are optically connected to each other through waveguide 16 of optical connector 10. Optical assembly 70 is created by inserting the first end section 46 of each optical fiber 40 into opening 18 of one of the receiving sections 14 of connector 10, and sliding the respective first end section 46 laterally along bottom surface 24 of the receiving section 14 toward inner end 19 and waveguide 16. Optical fiber 40 is inserted until the opposing sidewalls 52 of the first end section 46 contact the correspondingly-angled sidewalls 22 of the receiving section 14 of connector 10. Meanwhile, as shown in FIG. 6, the horizontal bottom surface 52 of the first end section 46 of the optical fiber 18 rests on the horizontal bottom surface 24 of the receiving section 14 of the connector 10, and the tip 50 of fiber 40 is at inner end 19 of receiving section 14 immediately adjacent to an orthogonal end surface 17 of waveguide 16.

By virtue of the alignment features of both fiber 18 and receiving section 14 of connector 10, e.g., the reciprocal tapering of the sidewalls 52, 22 of first end section 46 of fiber 40 and receiving section 14, respectively, and the juxtaposed horizontal bottom surfaces 54, 24 of first end section 46 of fiber 18 and receiving section 14, respectively, the core 14 of the first end portion 46 of optical fiber 40 is positioned for optical communication immediately adjacent to end surface 17 of waveguide 16 of connector 10 with precise three-dimensional alignment.

If desired, an adhesive 71 may be used to attach the optical fibers 40 to the abutting surfaces of receiving section 14 of connector 10 and to waveguide 16. The adhesive may be an optically clear epoxy material. The adhesive may be provided in receiving section 14 before the insertion of optical fiber 40 therein, or may be applied onto optical fiber 40 before such insertion. In this embodiment, an optically clear adhesive also is connected between tip 50 and end surface 17 of waveguide 16.

Figure 7:
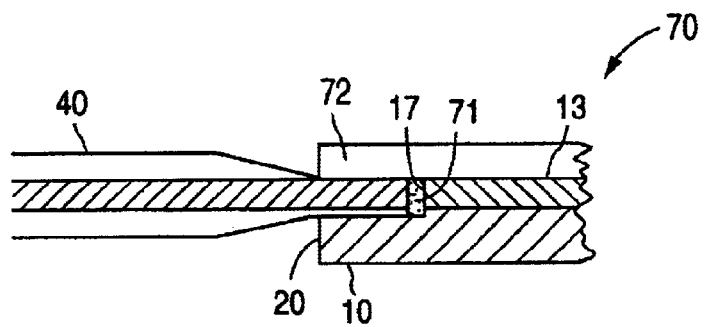
FIG. 7 is a cross-sectional side view of the optical assembly of FIG. 6 with a cover over the optical fiber and the optical connector.

In another embodiment, a cover may be provided for optical assembly 70. Referring to FIG. 7, a cover 72 rests on top surface 13 of base 12 of connector 10 so as to superimpose and cover the receiving sections 14, first end section 46, and waveguide 16. Cover 72 may be connected to base 12 by an adhesive, by a hinge, or some other connection means.

Figure 8:
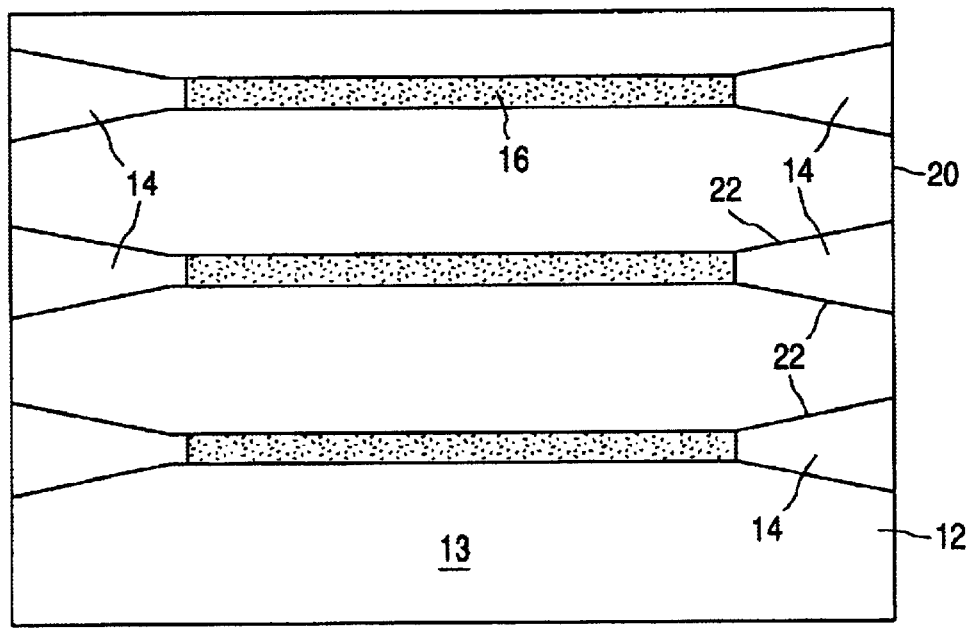
FIG. 8 is a top plan view of an alternative optical connector for optically connecting three pairs of the optical fibers of FIG. 3.

In an alternative embodiment, optical connector 10 may be made so as to optically connect a plurality of pairs of optical fibers 40 simply by increasing the number of pairs of opposing receiving sections 14, with each pair having a waveguide 16 between them. For example, three pairs of optical fibers 18 may be optically connected to connector 75 of FIG. 8, with each pair of fibers 40 being optically connected though a waveguide 16.

Figure 9:
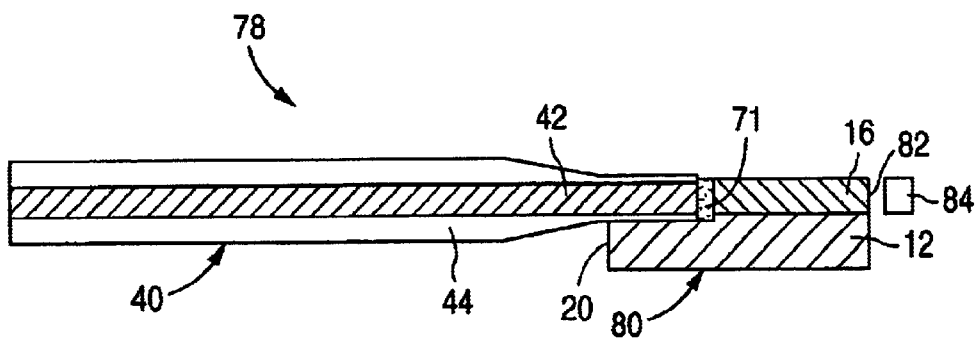
FIG. 9 is a cross-sectional side view of an alternative optical assembly wherein a light receiving or transmitting element is in optical communication with the optical fiber through the waveguide of the optical connector.

Another embodiment of an optical assembly within the present invention is shown in FIG. 9. Optical connector 80 of optical assembly 78 of FIG. 9 is essentially half of optical connector 10 of FIGS. 1 and 2. That is, one of the receiving ends 14 of connector 10 has been removed to form connector 80. An orthogonal end surface 82 of waveguide 16 is exposed at a peripheral side 20 of base 12. A light receiving or transmitting element 84, such as a laser diode or a light sensitive circuit (e.g., camera circuit) of a semiconductor chip, is positioned adjacent to the exposed surface 82 of waveguide 16 at peripheral side 20 of base 12 so as to be in optical communication with optical fiber 40 through waveguide 16.

Figure 10:
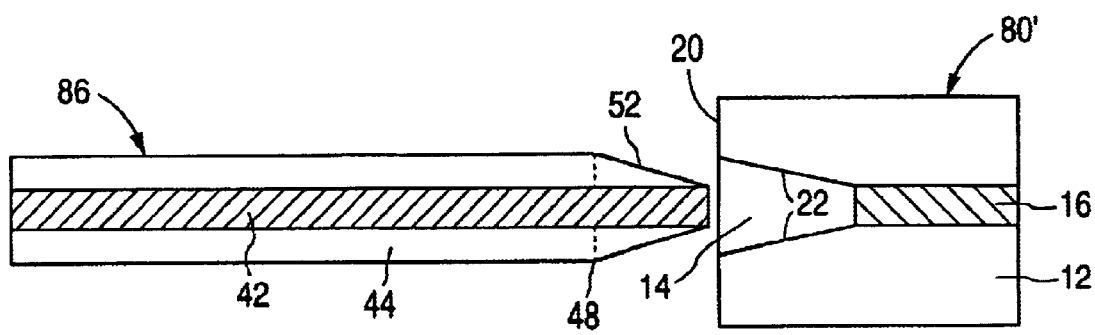
FIG. 10 is a top plan view of an alternative optical fiber and optical connector.
Figure 11:
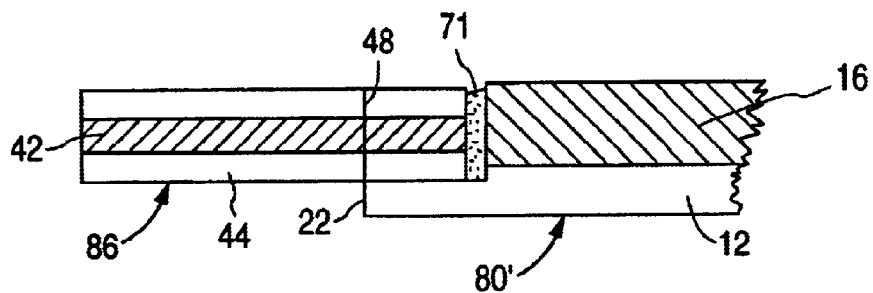
FIG. 11 is a cross-sectional side view of an optical assembly formed of the optical fiber and optical connector of FIG. 10.
Figure 12:
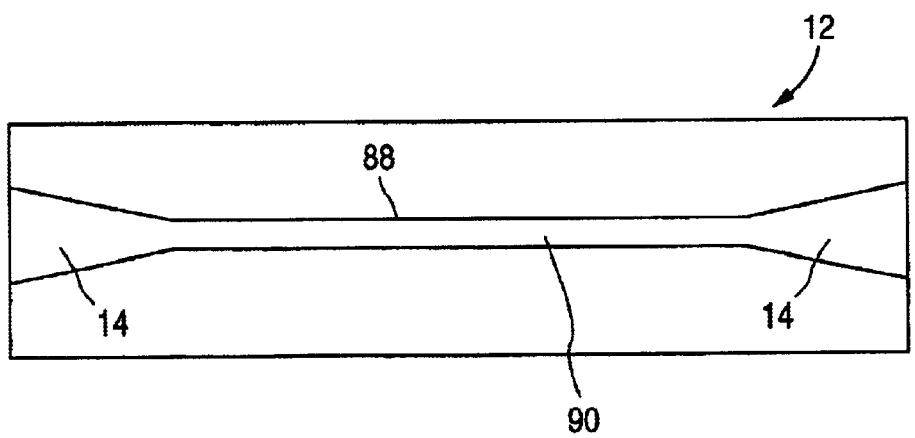
FIG. 12 is a top plan view of a molded polymeric base for an optical connector.

An alternative embodiment of an optical fiber 86 that may be used with a modified connector 80 (denoted as connector 80') is shown in FIGS. 10 and 11. In fiber 86, first end section 46 has tapered sidewalls 52 (see FIG. 1), but retains the curved top and bottom shape of cladding 44. The depth of receiving section 14 is approximately the same as the diameter of cladding 44 in this embodiment (see FIG. 11), and waveguide 16 would have to made so as to be vertically aligned with core 42 of optical fiber 86.

Connectors 10, 80 may be formed of various materials. For example, a matrix of bases 12 may be formed on a wafer of silicon or gallium arsenide. Receiving sections 14 may be formed by plasma etching or liquid etching the wafer through a photoresist mask. Waveguide 16 may be formed by doping the base material, as is conventionally done. Subsequently, individual connectors 10, 80 are diced from the wafer using a saw.

Alternatively, base 12 may be formed of a moldable polymeric material, as is described in U.S. patent application Ser. No. 09/751537, which is entitled "Tool and Method for Forming an Integrated Optical Circuit, is commonly assigned, was filed with the U.S. Patent and Trademark Office on the same day as or before the present application, and is incorporated herein by reference in its entirety.

For example, referring to FIG. 10, a base 12 with a channel 88 formed therein may be formed by compression molding a heated film of thermosetting polymer, thermoplastic, photopolymer, polycarbonate, or some other polymer, using a heated molding die. Subsequently, the patterned film is cured to harden it. Channel 88 has two receiving sections 14 with an empty middle section 90 therebetween. The molding die used to form base 12 and channel 88 may be made from a silicon or gallium arsenide wafer that is patterned using plasma etching, and then coated with a hard film (e.g., a film of metal, such as nickel) over the patterned surface. The molding die may be mounted on a press or a roller for contacting the heated polymer film. Alternatively, the molding die may be mounted in a cavity mold, and molten polymeric material may be injected into the mold so as to contact the molding die. Waveguide 16 may be formed by inserting an optically clear moldable polymeric second material into middle section 90 of channel 88, and then curing the second material.

Cover 72 of FIG. 7 may be a molded polymer material attached to base 12 by an epoxy adhesive.

Artisans will appreciate that the embodiments described above and shown in the figures are exemplary only, and that the claims provided below define the bounds of the invention.

What is claimed is:

1. An optical assembly comprising:
   a base having a first channel and a waveguide therein, said waveguide being optically accessible through the first channel, said first channel having tapered opposing sidewalls and a horizontal first surface perpendicular to the sidewalls;
   at least one optical fiber having a first end section including a tip of the fiber, said first end section having tapered opposing sidewalls extending to said tip and a planar first surface perpendicular to the sidewalls;
   wherein the taper of the sidewalls of the first channel matches with the taper of the sidewalls of the first end section of the optical fiber, and the first end section of the optical fiber is in the first channel so that the sidewalls of the first end section of the fiber abut the sidewalls of the channel, the first surface of the first end section of the fiber abuts the first surface of the first channel, and the tip of the fiber is positioned for optical communication with the waveguide.

2. The optical assembly of claim 1, wherein the first end section of the fiber further comprises a planar second surface opposite the first surface, said second surface also being perpendicular to the sidewalls.

3. The optical assembly of claim 1, further comprising an adhesive in said first channel connecting the first end section of the fiber to the first channel.

4. The optical assembly of claim 3, wherein the adhesive is optically clear and also is between the tip and the waveguide.

5. The optical assembly of claim 1, further comprising a cover over said first channel, said fiber, and said waveguide.

6. The optical assembly of claim 1, wherein the base is formed of a first polymeric material, and said waveguide is formed of a second polymeric material having a different index of refraction than said first polymeric material.

7. The optical assembly of claim 1, wherein said base is formed of a semiconductor material, and said waveguide is a doped region of said base.

8. The optical assembly of claim 1, further comprising a plurality of said first channels, one or more of said waveguides, and a plurality of optical fibers, wherein each of said channels optically accesses at least one of the waveguides, and each of the optical fibers is in one of said first channels positioned for optical communication with the respective waveguide.

9. The optical assembly of claim 8, wherein at least one of the optical fibers is positioned for optical communication with another of said optical fibers through one of the waveguides.

10. The optical assembly of claim 1, wherein the waveguide is between the optical fiber and a semiconductor chip adapted to provide light to or receive light from the optical fiber through the waveguide.

11. An optical fiber comprising:
    a core surrounded by a cladding; and
    a first end section including a tip, wherein the cladding of said first end section has opposing sidewalls tapering inwardly toward the core and a planar first surface perpendicular to said sidewalls and extending from one said tapered sidewall to the opposite said tapered sidewall.

12. The optical fiber of claim 11, wherein the first end section of the fiber further comprises a planar second surface opposite the first surface, said second surface also being perpendicular to the sidewalls.

13. A method of making an optical assembly comprising:
    providing a base having a first channel and a waveguide therein, said waveguide being optically accessible through the first channel, said first channel having tapered opposing sidewalls and a planar first surface perpendicular to the sidewalls;
    providing an optical fiber having a first end section including a tip of the fiber, said first end section having tapered opposing sidewalls extending to said tip and a planar first surface perpendicular to the sidewalls, wherein the taper of the sidewalls of the first channel matches with the taper of the sidewalls of the first end section of the optical fiber; and
    inserting the first end section of the optical fiber into the first channel so that the sidewalls of the first end section of the fiber abut the sidewalls of the channel, the first surface of the first end section of the fiber abuts the first surface of the first channel, and the tip of the fiber is positioned for optical communication with the waveguide.

14. The method of claim 13, further comprising connecting abutting surfaces of the first end section of the fiber and first channel with an adhesive.

15. The method claim 14, wherein the adhesive is optically clear and is also is provided between the tip and the waveguide.

16. The method of claim 13, further comprising providing a cover over said first channel, said fiber, and said waveguide.

17. An optical fiber comprising:
   a core surrounded by a cladding; and
   a first end section including a tip, wherein the cladding of said first end section has opposing sidewalls tapering inwardly toward the core and a planar first surface perpendicular to the sidewalls, said first surface extending inward from said tip and from a first one of the sidewalls to the opposite sidewall.

18. The optical fiber of claim 17, wherein said first end section further comprises a planar second surface opposite said planar first surface, said planar second surface also extending inward from said tip and from the first one of the sidewalls to the opposite sidewall.

19. The optical fiber of claim 17, wherein said optical fiber is coupled to a base having a first channel, said first channel having tapered opposing sidewalls and a planar first surface perpendicular to the sidewalls;
   wherein the taper of the sidewalls of the first channel matches with the taper of the sidewalls of the first end section of the optical fiber, and the first end section of the optical fiber is in the first channel so that the opposed sidewalls of the first end section of the fiber abut the sidewalls of the channel, and the planar first surface of the first end section of the fiber abuts the planar first surface of the first channel.

20. The optical fiber of claim 19, further comprising a cover coupled to the base, wherein the first channel of the base and the cover enclose the first end section of the optical fiber.

21. The optical fiber of claim 19, wherein said base includes a waveguide accessible through the first channel, and said tip is disposed for optical coupling to said wave guide.

22. The optical fiber of claim 19, wherein said first end section further comprises a planar second surface opposite said planar first surface, said planar second surface also extending inward from said tip and from the first one of the sidewalls to the opposite sidewall.

\* \* \* \* \*